United States Patent [19]

Soya et al.

[11] Patent Number: 4,816,845
[45] Date of Patent: Mar. 28, 1989

[54] IMAGE FORMING APPARATUS HAVING A STEPPING MOTOR WITH SELECTIVELY EXCITED COILS

[75] Inventors: Takashi Soya, Kawasaki; Junichi Kimizuka, Yokohama; Toshihiko Inuyama, Fujisawa; Yasutaka Noguchi, Kawasaki, all of Japan

[73] Assignee: Canon Kabushiki Kaisha, Tokyo, Japan

[21] Appl. No.: 139,115

[22] Filed: Dec. 28, 1987

Related U.S. Application Data

[63] Continuation of Ser. No. 843,594, Mar. 25, 1986, abandoned.

[30] Foreign Application Priority Data

Mar. 29, 1985 [JP] Japan ................................. 60-63881

[51] Int. Cl.⁴ ............................................... G01D 9/42
[52] U.S. Cl. ...................................... 346/108; 346/160
[58] Field of Search ................... 346/108, 107 R, 160

[56] References Cited

U.S. PATENT DOCUMENTS 4,578,689 3/1986 Spencer ............................... 346/108

FOREIGN PATENT DOCUMENTS 57-94711 6/1982 Japan .

*Primary Examiner*—E. A. Goldberg
*Assistant Examiner*—Mark Reinhart
*Attorney, Agent, or Firm*—Fitzpatrick, Cella, Harper & Scinto

[57] ABSTRACT

An image forming apparatus includes an recording medium, a beam radiating unit for radiating a beam to form an image on the recording medium, and a drive unit for driving the recording medium, wherein the drive unit has a stepping motor for performing a step operation of the recording medium.

12 Claims, 4 Drawing Sheets

DRUM DRIVE DIRECTION

LASER BEAM SCAN DIRECTION

IMAGE FORMING APPARATUS HAVING A STEPPING MOTOR WITH SELECTIVELY EXCITED COILS

This application is a continuation of application Ser. No. 843,594, filed Mar. 25, 1986, now abandoned.

BACKGROUND OF THE INVENTION

1. Field of the Invention

The present invention relates to an image forming apparatus for forming an image on a record medium such as a photosensitive member.

2. Related background art

FIG. 4 is a schematic view for explaining the operation of laser beam exposure according to the prior art, wherein a photosensitive drum 51 is rotated in a direction of arrow a with an drive means (not shown). Reference numerals 52 and 53 represent laser beams which are scanned for exposure in a direction of arrow b. The photosensitive drum 51 is controlled to rotate constantly at constant speed with the drive means upon reception of a copy start command.

In forming a latent image on the surface of the photosensitive drum 51, a laser beam 52 scans the photosensitive drum 51 while the latter is being rotated in the direction of arrow a. But, actually the laser beam 52 scanned in the direction of arrow b becomes a laser beam 53 whose locus is slanted by a certain angle relative to the laser beam 52. Therefore, there arises a problem that a correct latent image cannot be formed on the photosensitive drum 51.

SUMMARY OF THE INVENTION

It is therefore an object of the present invention to eliminate the above-described disadvantages.

It is another object of the present invention to provide an image forming apparatus capable of obtaining a high-quality reproduction image.

It is a further object of the present invention to provide an image forming apparatus capable of obtaining a faithful image with a simply constructed of the apparatus.

It is a still further object of the present invention to improve a recording apparatus which uses light beams for image recording.

It is another object of the present invention to provide an image forming apparatus capable of obtaining a stable image.

DETAILED DESCRIPTION OF THE PREFERRED EMBODIMENT

Figure 1:
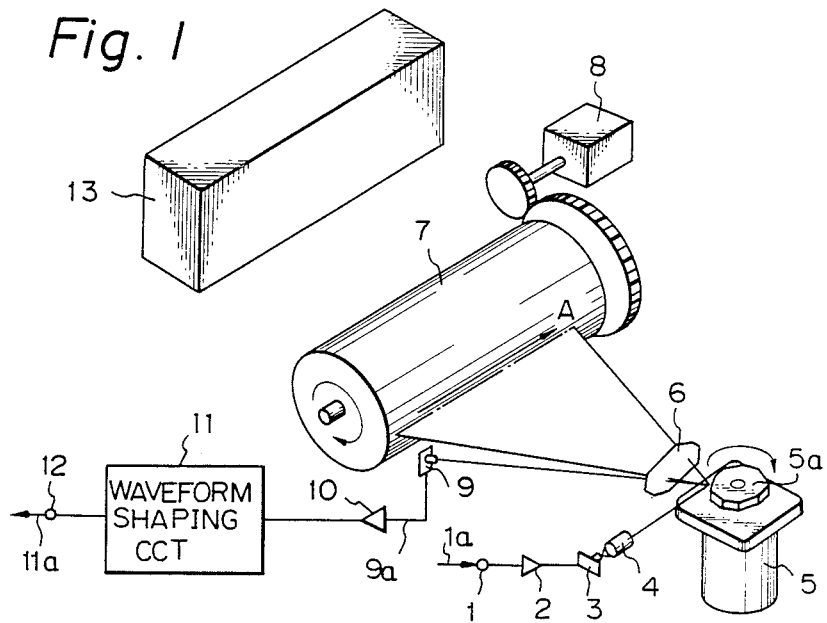
FIG. 1 is a perspective view for explaining the laser scan operation of an embodiment of the image forming apparatus according to the present invention.
Figure 4:
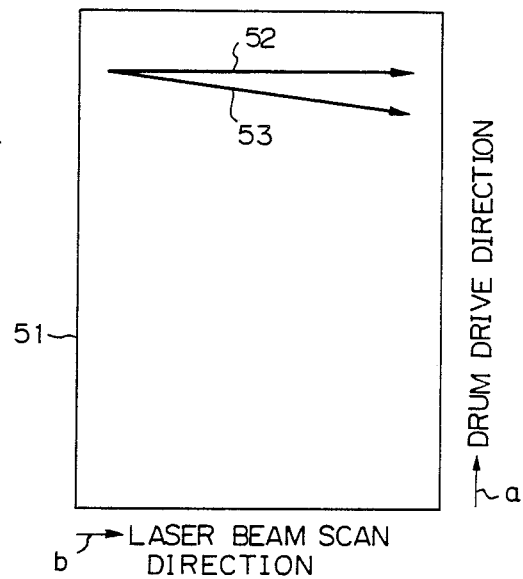
FIG. 4 is a schematic view for explaining the conventional laser beam scan.

FIG. 1 is a perspective view for explaining the laser scan operation of an embodiment of the image forming apparatus according to the present invention. In the figure, a video signal 1a (image information) is applied to an input terminal 1 and it is amplified by a video amplifier 2. The amplified video signal excites a semiconductor laser 3 and a resultant laser beam is collimated by a collimator lens 4. A scanner motor 5 rotates a polygonal mirror 5a at high speed. An f.θ lens 6 adjusts an optical path length of a laser beam reflected by the polygonal mirror 5a and uniformly focuses laser beams on a photosensitive drum 7. A drum driver 8 is constructed of a stepping motor. A laser beam detector 9 is mounted at a write position of a laser beam to be scanned in a lateral direction W of the photosensitive drum 7 for detecting the laser beam to thereby output a print synchronizing signal 9a (BD signal). The laser beam detector 9, for example of a photodiode. An amplifier 10 amplifies the print synchronizing signal 9a. The amplified print synchro signal 9a is shaped by a waveform shaping circuit 11 into a pulse signal having a predetermined pulse width. A drive pulse signal 11a produced by the waveform shaping circuit 11 is outputted from an output port 12 for driving of the drum driver 8. A fixing unit driver 13 fixes a transfer paper on which a toner image has been transferred, the fixing unit driver being constructed of a fixing roller (not shown), stepping motor and the like. As is well known, image data is outputted from a buffer (not shown) or the like in synchro with the BD signal 9a and is applied to the semiconductor laser.

Next, the operation of the image forming apparatus shown in FIG. 1 will be described with reference to FIG. 2.

Figure 2:
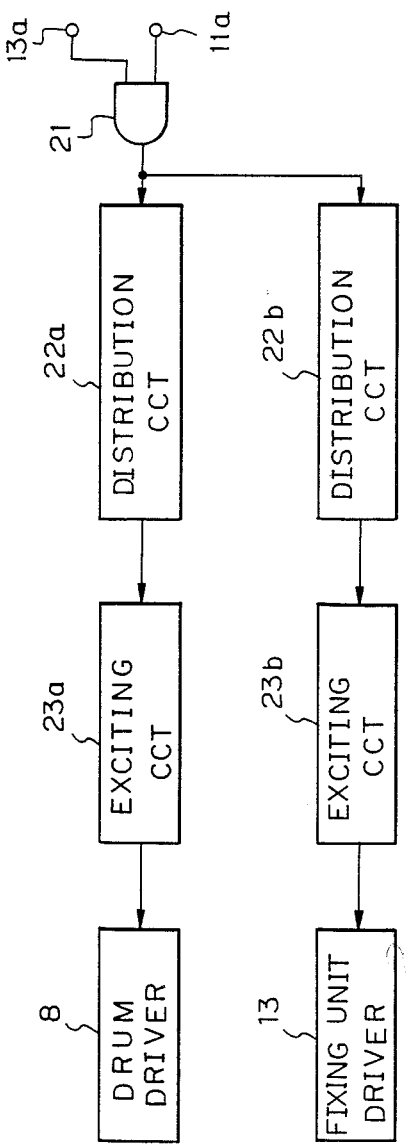
FIG. 2 is a block diagram showing an embodiment of the drive circuit used with the image forming apparatus of this invention.

FIG. 2 is a block diagram showing an embodiment of the drive circuit used with the image forming apparatus of this invention. In the figure, an AND gate 21 performs an AND operation between the drive pulse signal 11a and a signal 13a for enabling the drive operation of the drum driver 8 and fixing unit driver 13. Distribution circuits 22a and 22b select the phases of the stepping motors of the drum driver 8 and fixing unit driver 13. The distribution circuits may simply be constructed of switches or the like. Exciting circuits 23a and 23b excite the stepping motors at the phases designated by the distribution circuits 22a and 22b to thereby conduct predetermined step operations for the drum driver 8 and fixing unit driver 13. After the step operation of the photosensitive drum, if a video signal 1a containing image information is inputted to the input port 1 in sync with the BD signal 9a, the video signal is then amplified by the video amplifier 2 to drive the semiconductor laser 3. A laser beam radiated from the semiconductor laser 3 is shaped by the collimator lens 4 and deflected by the polygonal mirror 5a being rotated by the scanner motor 5. The deflected laser beam passes the f.θ lens 6 and horizontally scans the surface of the photosensitive drum 7. As a result, a latent image is formed by one line by the scanned laser beam on the photosensitive drum 7 which is stationary. By repeating the above operations, a one-frame image will be formed on the photosensitive drum 7.

In the above operations, an opening position to be written by a laser beam passed the f.θ lens 6 is detected by the laser beam detector 9 which in turn outputs a print synchronizing signal 9a. The print synchronizing signal 9a is amplified by the amplifier 10 and a drive pulse signal 11a whose width is adjusted by the waveform shaping circuit 11 is outputted via the output port 12 to the AND gate 21. The AND gate 21 performs an AND operation between the drive pulse signal 11a and the signal 13a for enabling to drive the drum driver 8 and fixing unit driver 13. Upon reception of both signals 11a and 13a, a pulse signal is outputted to the distribution circuits 22a and 22b. Each time the distribution circuits 22a and 22b receive the pulse signal from the AND gate, the exciting circuits 23a and 23b excite the stepping motors of the drum driver 8 and fixing unit driver 13 at the predetermined phases. In other words, each time a drive pulse signal 11a is outputted, the photosensitive drum 7 performs a step operation by a predetermined amount, and in addition the fixing unit roller and the like perform a step operation under drive of the stepping motor of the fixing unit driver 13. To ensure the application of a laser beam to the laser beam detector 9, it is noted that the laser beam is intentionally radiated at the area between the start and end scan positions of the laser beam detector 9. As noted above, in this embodiment, the photosensitive drum is rotated by a predetermined amount before a laser beam enters an image area.

Figure 3:
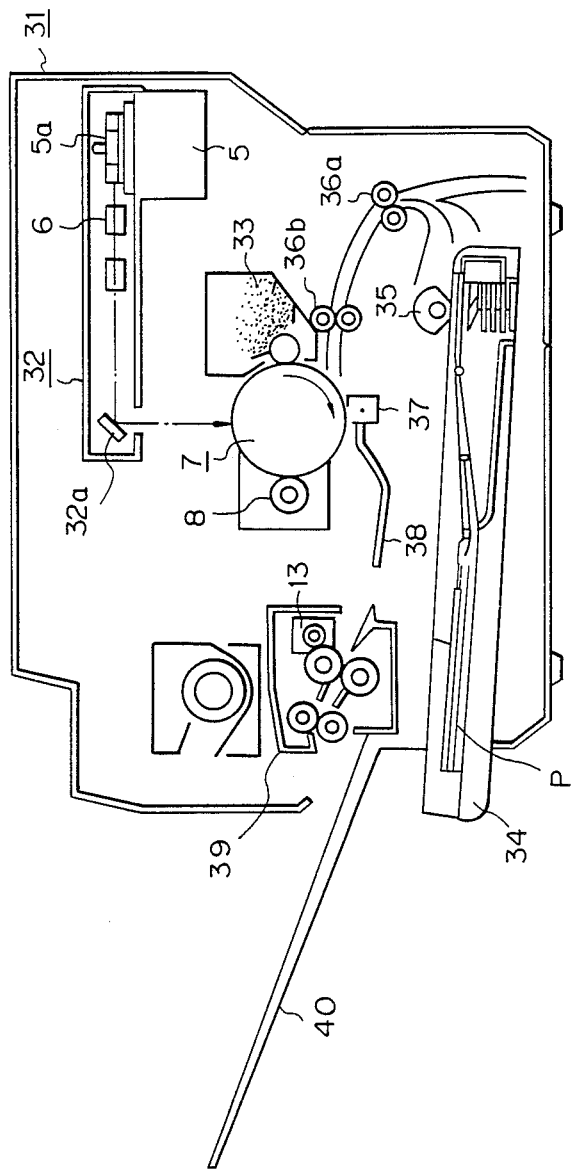
FIG. 3 is a cross-sectional view of a laser beam printer to which the present invention is applicable.

FIG. 3 is a cross-sectional view of a laser beam printer to which the present invention is applicable, wherein identical reference numerals have been used for the elements similar to those in FIG. 1.

In the figure, reference numeral 31 generally designates a laser beam printer. A scanning unit 32 is constructed of a scanner motor 5, polygonal mirror 5a, f.θ lens 6, scanning mirror 32a and the like. A developing unit 33 is filled therein with developer (toner). A paper feed cassette 34 contains recording paper P which is fed out by a paper feed roller 35. Paper conveying rollers 36a and 36b convey recording paper P to a photosensitive drum 7. A transfer charger 37 transfers a toner image onto recording paper P by means of corona discharge for example. Recording paper P separated from the photosensitive drum 7 is guided by a transport guide 38 to a fixer 39. A discharge tray 40 is for accumulating and stacking up recording paper P.

The image forming operation is performed in accordance with a known electrostatic photographing method, so the description therefor is omitted.

Figure 5:
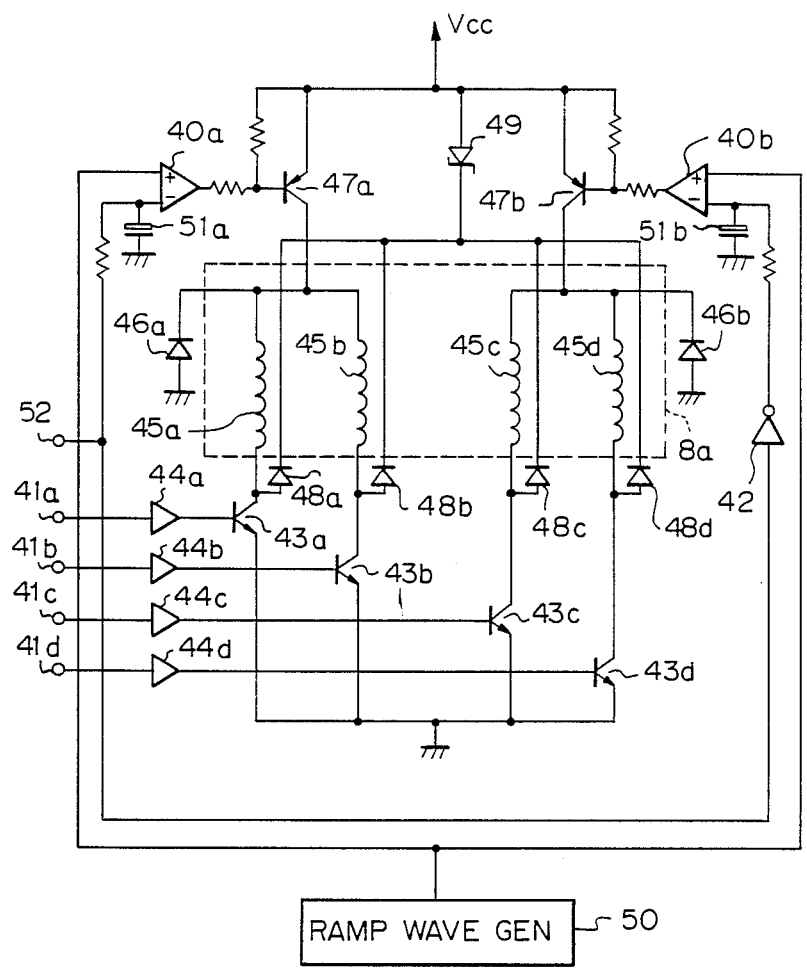
FIG. 5 is a detailed circuit diagram of the exciting circuit 23a and a part of the drum driver 8 shown in FIG. 2.

FIG. 5 is a detailed circuit diagram of the exciting circuit 23a and a part of the drum driver 8 shown in FIG. 2, which shows a circuit arrangement for driving a stepping motor. In the figure, references 45a to 45d designate exciting coils of the stepping motors, 43a to 43d designate switching transistors operating as exciting switches for energizing the respective exciting coils 45a to 45d, and 47a and 47b represent switching transistors for adjusting supply power by controlling the conduction durations of the respective exciting coils 45a to 45d under energization.

Diodes 48a to 48b and Zener diode 49 constitute an absorption circuit for absorbing a counter-electromotive force generated when any one of the exciting switches 43a to 43d (switching transistors) is opened. Similarly, diodes 46a and 46b constitute a circuit for discharging energy accumulated in any one of the exciting coils 45a to 45d when the corresponding one of the switching transistors 47a and 47b is cut off.

Terminals 41a to 41d are inputted with the output signals from the distribution circuit 22a. The output signals from the distribution circuit 22a inputted to the respective terminals 41a to 41d are amplified by the corresponding amplifiers 44a to 44d and thereafter, the amplified signals are respectively inputted to the switching transistors 43a to 43d. A current control output 52 from the distribution circuit 22a is supplied to a capacitor 51a and a capacitor 51b via an inverter 42 and also supplied to one input terminals of comparators 40a and 40b. A ramp signal of a ramp wave generator 50 is supplied to the other input terminals of the comparators 40a and 40b. In this embodiment, the ramp signal is used for the purpose of smoothly performing a step operation.

In operation, if the terminal 41a, for example, is selected by the distribution circuit 22a, then the switching transistor 43a turns on to energize the exciting coil 45a. Next, if the terminal 41c is selected, both switching transistors 43a and 43c turn on. At this time, the current control output 52 changes to a low level from a high level. Therefore, the output voltage of the capacitor 51a is gradually lowered and hence the output of the comparator 40a is gradually lowered. To the contrary, the output voltage of the capacitor 51b is gradually raised and hence the output of the comparator 40b is gradually raised.

That is, for example if the terminal 41a is changed to the terminal 41c under selection of the distribution circuit 22a, the output of the exciting coil 45a is gradually lowered, while the output of the exciting coil 45c is gradually raised.

The above operation is similarly repeated for each terminal. As a result, smooth rotation of each stepping motor is ensured during each step operation.

Use of the above circuit arrangement as shown in FIG. 5 enables a non-vibratory, smooth step operation of the stepping motor of the photosensitive drum 7. Therefore, vibration during a step operation of the photosensitive drum can be prevented, thereby enabling to obtain a high-quality reproduction image without blurring record.

The present invention is not intended to be limited to the above embodiments, but various modifications are possible within the scope of the appended Claims.

What is claimed is:

1. An image forming apparatus comprising:
   a recording medium;
   beam radiating means for radiating a beam to form an image on said recording medium; and
   drive means for driving said recording medium;
   wherein said drive means comprises a stepping motor for performing a step operation of said recording medium and an exciting circuit for exciting said stepping motor, said stepping motor being provided with a plurality of exciting coils,
   means whereby said exciting circuit gradually switches an output thereof into said exciting coils for each step operation of said stepping motor.

2. An image forming apparatus according to claim 1 further comprising detection means for detecting a scan position of a beam radiated by said beam radiating means, wherein said drive means drives said recording medium in accordance with a detection output from said detection means.

3. An image forming apparatus according to claim 2, wherein image data is applied to said beam radiating means in accordance with said detection output from said detection means.

4. An image forming apparatus according to claim 3, wherein said beam radiating means comprises a semiconductor laser and deflection means for deflecting and scanning said beam onto said recording medium.

5. An image forming apparatus according to claim 4, wherein said recording medium is a photosensitive drum.

6. An image forming apparatus comprising:
a recording medium;
beam irradiating means for radiating a beam to form an image on said recording medium;
drive means for driving said recording medium; and
detection means for detecting a scanning position of said beam radiated from said beam radiating means;
wherein a beam radiating operation by said beam radiating means and a drive operation of said recording medium by said drive means are controlled in accordance with a detection output from said detection means,
said drive means comprising a stepping motor provided with a plurality of exciting coils and an exciting circuit for exciting said exciting coils,
means whereby said exciting circuit gradually switches an output thereof into said exciting coils for each step operation of said stepping motor.

7. An image forming apparatus according to claim 6, wherein image data is applied to said beam radiating means in synchronism with said detection output from said detection means.

8. An image forming apparatus according to claim 7, wherein said exciting circuit gradually switches an output thereof into each of said exciting coils whenever a detection output is inputted from said detection means.

9. An image forming apparatus comprising:
a recording medium;
image forming means for forming an image onto said recording medium; and
drive means for driving said recording medium;
wherein said image forming means performs an image forming operation while said recording medium is stationary, and
said drive means comprises a stepping motor provided with a plurality of exciting coils and an exciting circuit for exciting said exciting coils,
means whereby said exciting circuit gradually switches an output thereof into each of said exciting coils for each step operation of said stepping motor.

10. An image forming apparatus according to claim 1, wherein said beam radiation means forms an image on said recording medium when said recording medium is stationary.

11. An image forming apparatus according to clam 2, wherein said exciting circuit gradually switches supply of an output thereof into each exciting coil whenever a detection output is inputted from said detection means.

12. An image forming apparatus according to claim 6, wherein said beam radiation means forms an image on said recording medium when said recording medium is stationary.

* * * * *